US012704640B2

(12) United States Patent
Phan et al.

(10) Patent No.: US 12,704,640 B2
(45) Date of Patent: Aug. 11, 2026

(54) SYSTEM AND METHOD FOR GNSS SPOOFER DETECTION WITH HIGH INTEGRITY ERROR BOUNDING USING MULTIPLE COASTING SOLUTIONS

(71) Applicant: Rockwell Collins, Inc., Cedar Rapids, IA (US)

(72) Inventors: Huan T. Phan, Marion, IA (US); Angelo J. Joseph, Melbourne, FL (US); Bernard A. Schnaufer, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 531 days.

(21) Appl. No.: 18/109,626

(22) Filed: Feb. 14, 2023

(65) Prior Publication Data

US 2024/0272303 A1 Aug. 15, 2024

(51) Int. Cl.
*G01S 19/21* (2010.01)
*G01S 19/39* (2010.01)
*G01S 19/49* (2010.01)

(52) U.S. Cl.
CPC .......... *G01S 19/215* (2013.01); *G01S 19/396* (2019.08); *G01S 19/49* (2013.01)

(58) Field of Classification Search
CPC ...... G01S 19/215; G01S 19/396; G01S 19/47; G01S 19/49
See application file for complete search history.

(56) References Cited

U.S. PATENT DOCUMENTS 6,166,683 A * 12/2000 Hwang .................. G01S 19/20 342/357.58
6,281,836 B1 * 8/2001 Lupash .................. G01C 21/24 342/357.58

(Continued)

FOREIGN PATENT DOCUMENTS

EP 2992358 B1 7/2019
EP 3940425 A3 3/2022
EP 4105690 A1 12/2022

OTHER PUBLICATIONS

European Patent Office, Extended European Search Report received in EP Application No. 24157573.7, Jul. 12, 2024, 13 pages.

(Continued)

*Primary Examiner* — Cassi J Galt
(74) *Attorney, Agent, or Firm* — Suiter Swantz IP

(57) ABSTRACT

A system and method for detection of GNSS signal spoofing with high integrity error bounding determines a parity space formulation for coordinates of a GNSS-driven master position solution (e.g., fully absolute/GNSS or blended GNSS/IRS solution) and a corresponding coasted position solution (e.g., less frequently GNSS-updated), wherein a parity vector expresses consistency of the master coordinate with the coasted coordinate. Based on a desired level of missed detection, protection levels are determined for the parity space formulation, and integrity bounds on the master and coasted solutions calculated. The parity vector is compared with a detection threshold. If, for any solution component (e.g., direction, axis) of the master solution, the parity vector meets or exceeds the threshold, a spoofer is detected and a coasted solution is propagated with its coasted integrity bound. If no spoofer is detected, the master solution and its master integrity bound are propagated as output.

17 Claims, 5 Drawing Sheets

(56) References Cited

U.S. PATENT DOCUMENTS

| | | | | |
|---|---|---|---|---|
| 8,922,427 | B2 | 12/2014 | Dehnie et al. | |
| 9,513,129 | B2 | 12/2016 | Wang | |
| 9,849,978 | B1 | 12/2017 | Carmack et al. | |
| 10,641,906 | B2 | 5/2020 | Altrichter | |
| 10,739,466 | B2 | 8/2020 | Grobert | |
| 11,002,858 | B2 | 5/2021 | Broumandan et al. | |
| 11,163,068 | B2 | 11/2021 | Balog et al. | |
| 11,194,052 | B1 | 12/2021 | Kazmierczak et al. | |
| 11,194,053 | B1 | 12/2021 | Johnston et al. | |
| 11,442,174 | B2 | 9/2022 | Cao et al. | |
| 2002/0109628 | A1* | 8/2002 | Diesel | G01S 19/26 342/357.31 |
| 2009/0069960 | A1* | 3/2009 | Lapp | G05D 1/0077 701/16 |
| 2011/0102259 | A1 | 5/2011 | Ledvina et al. | |
| 2014/0097984 | A1 | 4/2014 | Stevens | |
| 2019/0243002 | A1 | 8/2019 | Song | |
| 2021/0123740 | A1* | 4/2021 | Allen | G01C 21/20 |
| 2022/0057526 | A1 | 2/2022 | Keyzer et al. | |
| 2022/0082704 | A1 | 3/2022 | Lemke et al. | |
| 2022/0236425 | A1 | 7/2022 | Zangvil et al. | |
| 2022/0308237 | A1 | 9/2022 | Clausen et al. | |
| 2024/0036217 | A1* | 2/2024 | Bageshwar | G01S 19/49 |

OTHER PUBLICATIONS

Imparato et al., "Integrity Monitoring: from Airborne to Land Applications," Multifunctional Operation and Application of GPS, May 30, 2018, pp. 23-43.

Rothmaier et al., "Providing Continuity and Integrity in the Presence of GNSS Spoofing," GNSS 2021, Proceedings of the 34th International Technical Meeting of the Satellite Division of the Institute of Navigation, Sep. 24, 2021, pp. 1828-1842.

Wang et al., "A Survey on Integrity Monitoring of GNSS Navigation for Ground Vehicles," GNSS 2021—Proceedings of the 34th International Technical Meeting of the Satellite Division of the Institute of Navigation, Sep. 24, 2011, pp. 2591-2601.

Patrick Y. Hwang et al., "From RAIM to NIORAIM, A New Integrity Approach to Integrated Multi-GNSS Systems,"; Inside GNSS, May/Jun. 2008, pp. 24-33, www.insidegnss.com.

* cited by examiner 300
302
SLOPE
208
PROTECTION LEVEL
306 (MEAN $\mu_p$, $\mu_e$)
304
$C_{P-E} = \begin{bmatrix} C_{PP} & C_{PE} \\ C_{EP} & C_{EE} \end{bmatrix}$
202
206
304a
TEST THRESHOLD
MISSED DETECTION REGION
204
308
ESTIMATION ERROR e
TEST STATISTIC/PARITY MAGNITUDE p

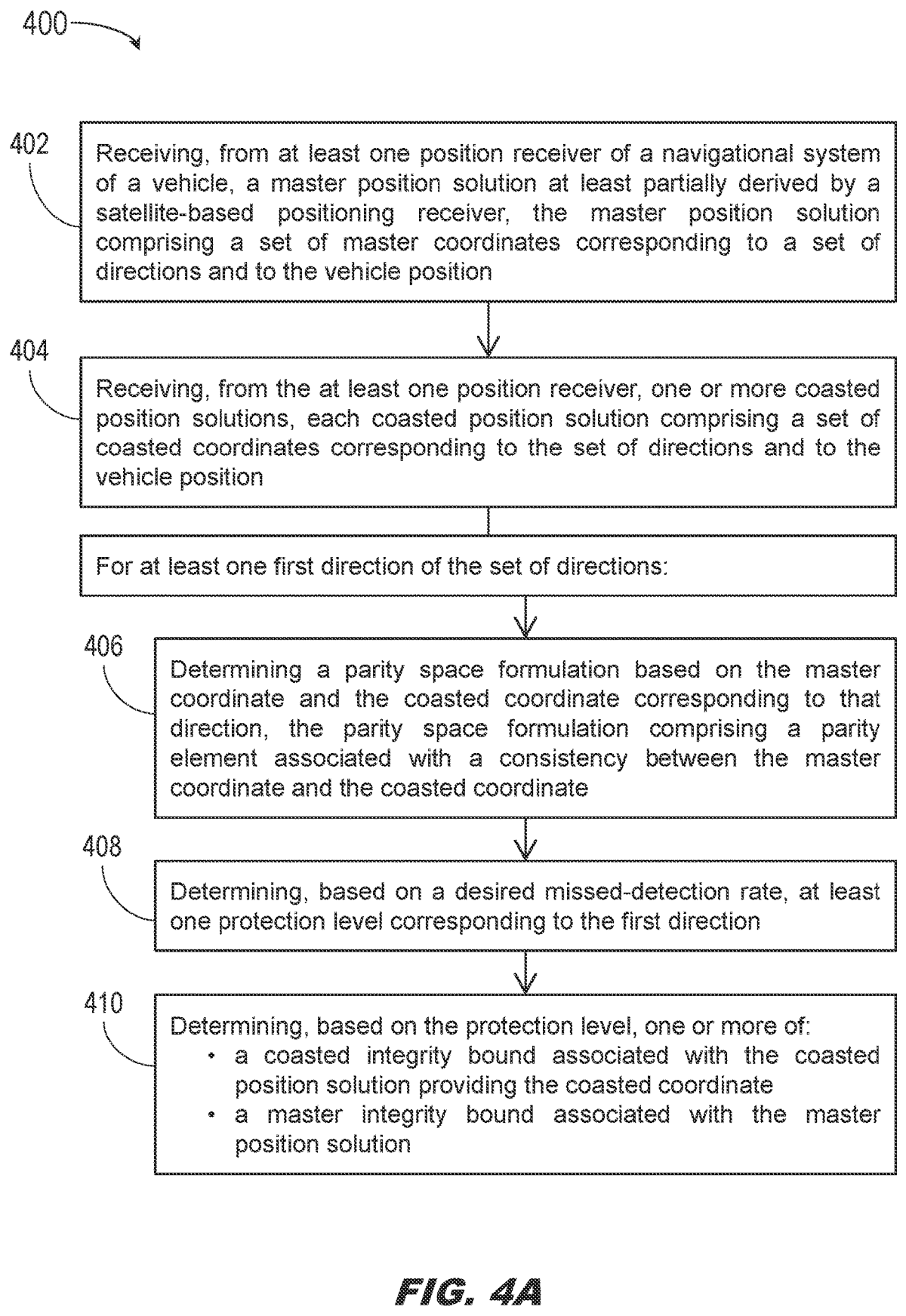

400

402 Receiving, from at least one position receiver of a navigational system of a vehicle, a master position solution at least partially derived by a satellite-based positioning receiver, the master position solution comprising a set of master coordinates corresponding to a set of directions and to the vehicle position 404 Receiving, from the at least one position receiver, one or more coasted position solutions, each coasted position solution comprising a set of coasted coordinates corresponding to the set of directions and to the vehicle position For at least one first direction of the set of directions:

406 Determining a parity space formulation based on the master coordinate and the coasted coordinate corresponding to that direction, the parity space formulation comprising a parity element associated with a consistency between the master coordinate and the coasted coordinate 408 Determining, based on a desired missed-detection rate, at least one protection level corresponding to the first direction 410 Determining, based on the protection level, one or more of:

- a coasted integrity bound associated with the coasted position solution providing the coasted coordinate
- a master integrity bound associated with the master position solution

FIG. 4A

SYSTEM AND METHOD FOR GNSS SPOOFER DETECTION WITH HIGH INTEGRITY ERROR BOUNDING USING MULTIPLE COASTING SOLUTIONS

BACKGROUND

Broadly speaking, integrity assurance involves checking a non-trusted source of information against a trusted source. For example, receiver autonomous integrity monitoring (RAIM) may be performed to verify the integrity of global navigation satellite system (GNSS) based absolute positions derived from positioning signals transmitted by navigational satellites (e.g., at a known transmission time) and received by onboard GNSS receiver systems (e.g., at a known reception time). GNSS positioning signals do not include any information useful for integrity verification, so RAIM algorithms test signals transmitted by each individual satellite in a visible constellation (e.g., all satellites from which the GNSS receiver is able to receive a positioning signal, an absolute position based on distances to each satellite derived from timing information included in each positioning signal) against the other satellites in the visible constellation, based on the assumption that satellite-based faults are rare and will only affect one satellite at a time.

However, GNSS spoofing, or malicious interference with GNSS measurements (leading to inaccurate GNSS-derived positions, which may in turn constitute hazardously misleading information (HMI) for aircraft dependent on GNSS-based positioning for navigation and/or traffic management) may render multiple satellites, or even an entire constellation, non-trusted.

SUMMARY

In a first aspect, a vehicle-based navigational system for detecting global navigation satellite system (GNSS) signal spoofing with high integrity error bounding is disclosed. In embodiments, the system receives a GNSS-driven master position solution (e.g., fully or partially derived by a GNSS receiver from satellite-based positioning signals) and one or more coasted position solutions (e.g., based on a blended GNSS/IRS solution but updated less frequently with GNSS absolute position data and thus "coasting" or "drifting" on the last known absolute position). The master solution and each coasted solution each provide a position solution expressed in a set of solution components, e.g., coordinates relative to a set of directions or axes (e.g., x, y, z). For each solution component, a parity space formulation is calculated for a master coordinate of the master solution and its corresponding coasted coordinate from an available coasted solution, the parity space formulation characterizing consistency of the master coordinate with the coasted coordinate as a test element. Based on a desired or allowable rate of missed detections of GNSS spoofing, protection levels are determined for each solution component. Based on the protection levels, integrity bounds are computed for the master solution and the coasted solution. The test element for each solution component is compared to a detection threshold; if for any component the test element meets or exceeds the threshold, a potential GNSS spoofing fault is indicated, and a coasted solution is propagated as the output solution for the navigational system along with its coasted integrity bound, without further updates by the master solution. If, however, for each solution component each test element remains below threshold levels, no spoofing is indicated and the master solution is output with its master integrity bound.

In some embodiments, the master solution is a fully GNSS-based absolute position solution fully based on positioning signals received from navigational satellites.

In some embodiments, navigational satellites contributing to the absolute position solution belong to more than one constellation.

In some embodiments, the system selects the detection threshold based on a desired false-alarm rate.

In some embodiments, each coasted solution is based on a blended GNSS/IRS solution (determined by a GNSS receiver and partially by an inertial reference system (IRS)), relative to a last known absolute position and periodically updated with absolute position data from the GNSS receiver. For example, coasted solutions are updated with absolute position data, but at longer intervals than the blended solution. In some embodiments, if multiple coasted solutions are available, each coasted solution may receive solution updates at the same frequency, but at times offset relative to each other, such that at any given time each coasted solution is "coasting" for a different time interval since its last update.

In some embodiments, the master solution is a blended GNSS/IRS position solution.

In some embodiments, when a GNSS spoofer is detected, the least recently updated coasted solution is propagated as the output solution.

In some embodiments, a master integrity bound on the master solution is determined by selecting the minimum protection level available from those protection levels determined for the solution components of the master solution.

In some embodiments, the master or coasted integrity bound includes a combined lateral (horizontal) integrity bound based on lateral (e.g., x-direction and y-direction) integrity bounds, based in turn on lateral/horizontal (e.g., x-direction and y-direction) protection levels.

In a further aspect, a method for GNSS spoofer detection with high integrity error bounding is also disclosed. In embodiments, the method includes receiving a GNSS-driven master solution from a vehicle-based position receiver, the master solution at least partially based on an absolute position derived from positioning signals received by the position receiver from navigational satellites. For example, the master solution includes a second lateral set of master coordinates (solution components) expressing the absolute position in terms of, e.g., directions, rotational axes, degrees of freedom (e.g., x/y/z). The method includes receiving one or more coasted solutions, each coasted solution likewise incorporating a set of coasted coordinates expressing a relative position (e.g., relative to a last known absolute solution update) in terms of the directions, axes, etc. The method includes, for each solution component of the master and coasted solution, determining a parity space formulation characterizing the consistency of a master coordinate relative to its counterpart coasted coordinate. The method includes determining, based on a desired missed detection rate, protection levels for each solution component (e.g., for bounding estimation error in the master coordinate). The method includes determining, based on the determined protection levels, coasted integrity bounds for the coasted solutions and a master integrity bound for the master solution. The method includes comparing a test statistic of the parity space formulation to a detection threshold to detect potential GNSS spoofing. The method includes, when for any solution component a test statistic meets or exceeds the detection threshold, indicating a detected GNSS spoofer and propagating as an output solution a coasted solution and its corresponding coasted integrity bound without further updates from the GNSS receiver (which are likely tainted by the detected spoofer). The method includes, when for each solution component no test statistic meets the threshold level, propagating the master solution and master integrity bound as the output solution.

In some embodiments, the method includes receiving as the master solution a fully GNSS-driven absolute position solution from the GNSS receiver.

In some embodiments, the method includes receiving one or more coasted solutions based on a blended GNSS/IRS solution. For example, each coasted solution is a blended GNSS/IRS solution like the blended solution, but updated with absolute position data at longer intervals than the blended solution (and thus "coasting" longer on its last absolute solution update). In some embodiments, the method includes receiving multiple coasted solutions, wherein each coasted solution receives absolute solution updates offset from each other coasted solution (although the update period may be the same for all coasted solutions).

In some embodiments, the method includes receiving a blended GNSS/IRS solution as the master solution.

In some embodiments, the method includes selecting a detection threshold (test threshold) based on a desired false-alarm rate.

In some embodiments, the method includes, when a spoofer is indicated, selecting and propagating the least recently updated coasted solution (e.g., of a set of offset coasted solutions) as the output solution.

In some embodiments, the method includes determining a master integrity bound by selecting the minimum protection level of all protection levels determined for the solution components of the master solution.

In some embodiments, the method includes determining the master or coasted integrity bound by determining lateral integrity bounds (e.g., x-direction and y-direction) based on lateral (horizontal; e.g., x-direction and y-direction) protection levels, and determining a combined lateral (horizontal) integrity bound based on the x-direction and y-direction lateral integrity bounds.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

FIGS. 4A through 4C are flow diagrams illustrating a method for high integrity detection of GNSS signal spoofing according to example embodiments of this disclosure.

DETAILED DESCRIPTION

Figure 1:
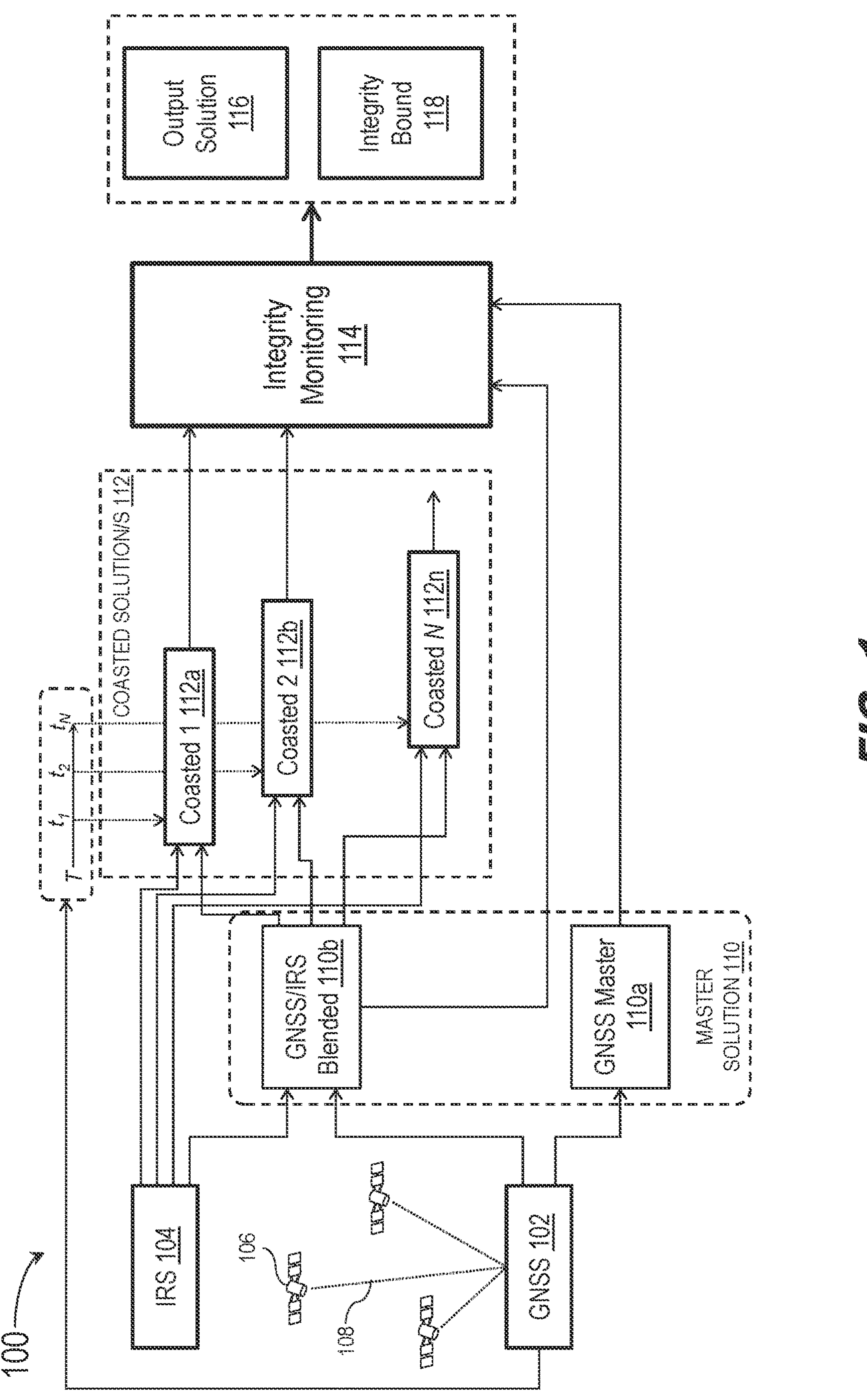
FIG. 1 is a block diagram illustrating a navigation system configured for high integrity global navigation satellite system (GNSS) signal spoofer detection according to example embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Broadly speaking, embodiments of the inventive concepts disclosed herein are directed to a system and method for protecting non-trusted global navigation satellite system (GNSS) based position solutions (e.g., position/navigation/time (PNT) solutions) against GNSS spoofing threats by using inertial coasting solutions as trusted sources to detect spoofed GNSS position solutions. Further, parity space computational methodology may be used not only to detect spoofers, but to generate protection levels bounding the positional error of an output solution (whether said output solution is a non-trusted master solution or a trusted coasted solution substituted for an affected master solution).

Referring now to FIG. 1, a navigational system 100 for an aircraft or other vehicle (e.g., land-based, water-based) is shown. The navigational system 100 may include a GNSS receiver 102 and a dead-reckoning sensor such as an inertial reference system 104 (IRS). For example, the GNSS receiver 102 may provide absolute position solutions (e.g., PNT solutions) based on multilateration of positioning signals 108 transmitted by navigational satellites 106 and received by the GNSS receiver. As each positioning signal 108 includes position information for the transmitting satellite as well as ranging information allowing the GNSS receiver 102 to determine a distance to the transmitting satellite, given enough transmitting satellites visible to the GNSS receiver, the receiver may derive a precise absolute position of the vehicle relative to an earth-centered earth-fixed (ECEF) reference frame.

Navigational satellites 106 may be organized into constellations, or systems of satellites deployed in orbit wherein a given constellation may serve as an alternative or a complement to other constellations (e.g., the United States Global Positioning System (GPS) and augmentations thereof (e.g., Satellite Based Augmentation System (SBAS), Wide Area Augmentation System (WAAS)); GLONASS (Russian Federation), BeiDou (People's Republic of China); Galileo (European Union); and/or other national/regional constellations or satellite systems under development currently or in the future). In some embodiments, the GNSS receiver 102 may determine an absolute position solution based on positioning signals 108 received from multiple satellites 106 within a single constellation. Alternatively, or additionally, the GNSS receiver 102 may derive an absolute position solution based on positioning signals 108 received from visible navigational satellites 106 belonging to more than one constellation or system.

In embodiments, the navigation system 100 may protect a non-trusted master solution 110 at least partially derived by the GNSS receiver 102 from potential spoofing affecting the positioning signals 108 or navigational satellites 106 by using as a trusted source one or more inertial coasted solutions 112. For example, the master solution 110 may be a fully GNSS-based solution 110*a* fully derived by the GNSS receiver 102. In some embodiments, the master solution 110 may be a blended position solution 110*b* based on a relative position solution derived by the IRS 104. For example, the relative position solution may be based on inertial measurements of the position and/or orientation ("pose") of the vehicle relative to a last known absolute position solution (110*a*) determined by the GNSS receivers 102, and updated with new absolute position data from the GNSS receivers whenever said absolute position data is available. If, for example, the vehicle passes through airspace or terrain where GNSS services are denied or unreliable, the blended position solution 110*b* may provide the most accurate bridging solution until GNSS services are restored.

In embodiments, the navigation system 100 may have access to one or more inertial coasted solutions 112 (e.g., N coasted solutions 112*a*, 112*b* . . . 112*n*, where N is an integer) which may be based on the blended position solution 110*b* except that the coasted solutions may be updated with absolute position data from the GNSS receiver 102 at longer update periods than the blended position solution. In some embodiments, the navigation system 100 may maintain more than one inertial coasted solution 112*a*-112*n* with update periods offset relative to each other. For example, a single coasted solution 112 may update every 48 seconds ($t_N$). Multiple coasted solutions 112*a*-112*n*, however, may likewise update every 48 seconds but offset from each other, such that for a set of three coasted solutions and for each 48-second window, the coasted solution 112*a* updates at 16 seconds ($t_1$), the coasted solution 112*b* updates at 32 seconds ($t_2$), and the coasted solution 112*n* (which updated at 0 seconds) updates again at 48 seconds ($t_N$). Between updates, each coasted solution 112*a*-112*n* may degrade in accuracy due to drift inherent in the IRS 104 as the solution "coasts" relative to its last update. However, the coasted solutions 112*a*-112*n* may not be susceptible to GNSS faults during this coasting period, and thus may serve as trusted solutions.

In embodiments, the navigation system 100 may select one of a set of available inertial coasting solutions 112, 112*a*-112*n* for use as a trusted solution for integrity analysis of the master solution 110 (e.g., if more than one coasting solution is available). For example, at a time of 47 seconds within the 48-second update window ($t_N$), the coasted solution 112*b* (having last updated at 32 seconds, $t_2$) may have accumulated the least amount of drift error (having coasted for the shortest time), and may therefore be the best candidate for detecting potential spoofing with respect to the master solution 110. In some embodiments, the navigation system 100 will perform integrity monitoring of the master solution 110 with respect to each available coasted solution 112, 112*a*-112*n* (e.g., one, three, or N coasted solutions, depending on available processing power, desired false-alarm distribution, desired spoofer detection performance, etc.).

In embodiments, the system 100 will perform integrity monitoring (114) via cross comparison of the GNSS-driven master solution 110 with available inertial coasted solutions 112, 112*a*-112*n*. For example, integrity monitoring 114 may be embodied in encoded instructions configured for execution on processors of the navigation system 100.

In embodiments integrity monitoring 114 may incorporate parity space formulation whereby a test threshold (e.g., detection threshold) is defined within parity space (e.g., based on a desired false-alarm rate) and when parity test statistics meet or exceed the test threshold, GNSS spoofing may be indicated as the source of the induced position error with respect to the master solution 110. If GNSS fault due to spoofing is indicated by integrity monitoring 114, an inertial coasted solution 112, 112*a*-112*n* free of, or less susceptible to, the detected GNSS spoofing may be substituted for the tainted master solution 110 as an output position solution 116 (e.g., PNT solution) for use by the navigation system 100. Alternatively, if GNSS spoofing is not detected the master solution 110 may be maintained as the output solution 116.

Further, in embodiments integrity monitoring 114 may provide for the computation of protection levels bounding any estimation errors of the master solution 110 prior to detection of GNSS faults. For example, protection levels associated with a particular coasted solution 112 may be based on a desired probability of missed detection via integrity monitoring 114. Based on the computed protection levels, the output solution 116 (whether the output solution is the master solution 110 or a coasted solution 112) may include an appropriate integrity bound 118 based on the computed protection levels.

Figure 2:
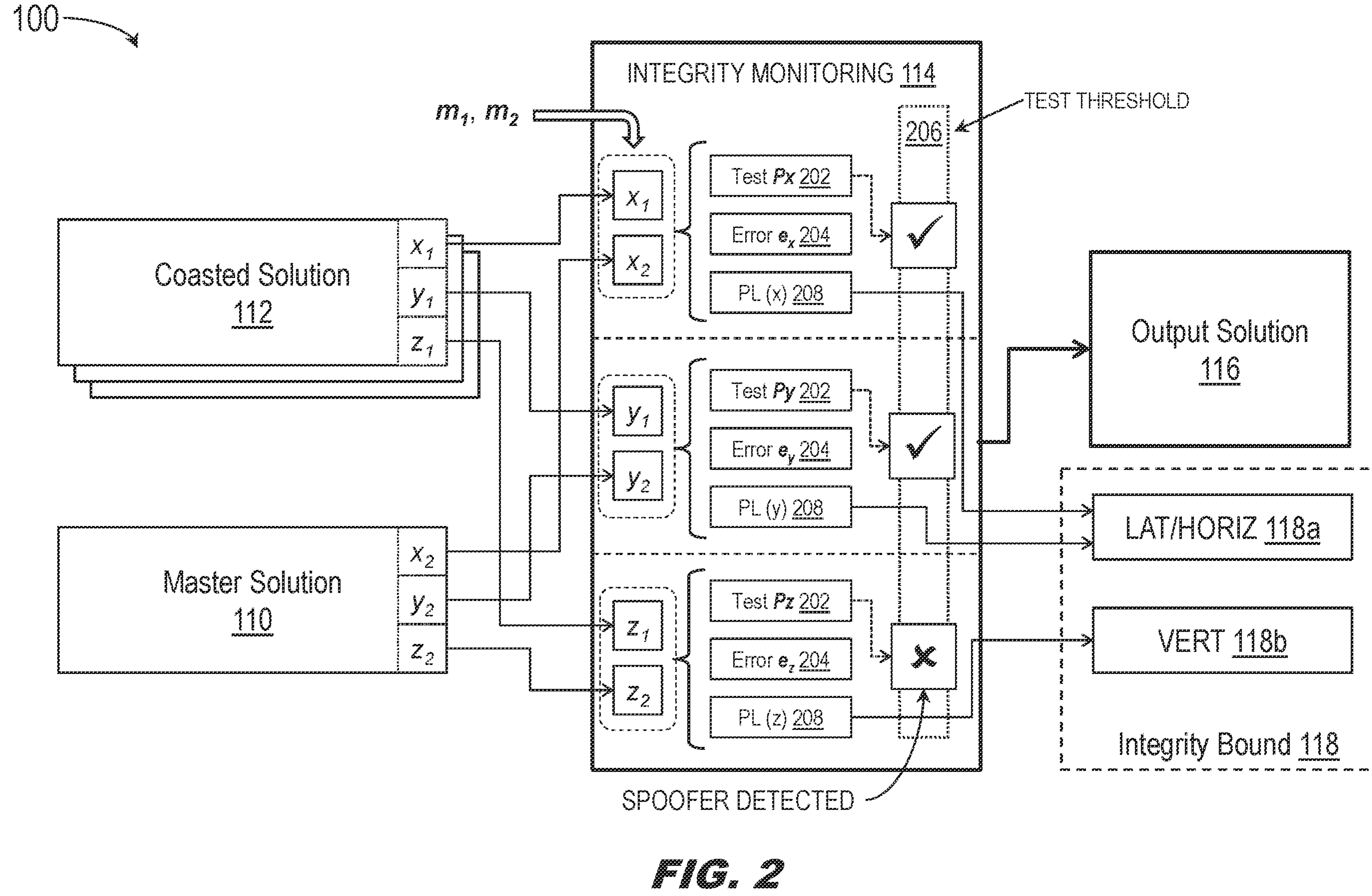
FIG. 2 is a block diagram illustrating integrity monitoring and spoofer detection operations of the navigation system of FIG. 1.

Referring now to FIG. 2, the navigation system 100 is shown.

In embodiments, the navigation system 100 may provide integrity monitoring 114 of the GNSS-driven master solution 110 by detecting spoofer-induced GNSS fault via cross comparison of the master solution with one or more inertial coasting solutions 112 (112*a*-112*n*, FIG. 1) for consistency. For example, the master solution 110 and coasted solution/s 112 may each include a set of coordinates (e.g., coasted coordinates $x_1$, $y_1$, $z_1$; master coordinates $x_2$, $y_2$, $z_2$), each coordinate corresponding to a relative or absolute position measurement with respect to a particular direction or rotational axis. Further, position or movement as measured by x and y coordinates may be associated with horizontal or lateral movement of the vehicle with respect to a particular reference frame (e.g., relative to vehicle pitch or roll axes), and position or movement measured by z coordinates may be associated with vertical movement (e.g., climb or descent relative to a vehicle yaw axis).

In embodiments, integrity monitoring 114 within the navigation system 100 may test for GNSS spoofing with respect to each direction of the master solution 110, such that detection of spoofer-induced fault with respect to any direction x, y, or z in the local level frame) triggers an overall indication of spoofing with respect to the master solution. For example, integrity monitoring 114 may cross compare (with respect to each direction x, y, z) each coasted coordinate $m_1$ (e.g., $x_1$, $y_1$, or $z_1$) of the coasted solution 112 with its corresponding master coordinate $m_2$ (e.g., $x_2$, $y_2$, or $z_2$) of the master solution 110.

In embodiments, integrity monitoring 114 may estimate a position state X based on the position measurements of coasted and master coordinates $m_1$, $m_2$. For example, after conditioning H for the same sigma, the measurement model connecting the coasted and master coordinates $m_1$, $m_2$ to the position state X may be expressed as (given nominal random errors ε and faults f):

$$\underbrace{\begin{bmatrix} \lambda m_1 \\ m_2 \end{bmatrix}}_{m'} = \underbrace{\begin{bmatrix} \lambda \\ 1 \end{bmatrix}}X + \underbrace{\begin{bmatrix} \lambda \varepsilon_1 \\ \varepsilon_2 \end{bmatrix}}_{\varepsilon'} + \underbrace{\begin{bmatrix} \lambda f_1 \\ f_2 \end{bmatrix}}_{f'}$$

where $$\lambda = \frac{\sigma_2(GPS)}{\sigma_1(\text{Null})}.$$

Further, the general weighted least-squares solution $\hat{X}_{WLS}$ estimating the position state X based on the redundant measurements of coasted and master coordinates $m_1$, $m_2$ may be computed:

$$\hat{X}_{WLS} = \left[(wH')^T wH'\right]^{-1}(wH')^T\left(w^T m'\right)$$

In embodiments, due to the measurement redundancy of the coasted and master coordinates $m_1$, $m_2$, integrity monitoring 114 may form a single-element parity vector p 202 (e.g., vector of scalar parity element Pm∈{Px, Py, Pz} such that each scalar component, p, is computed as $$p = \text{Pm}$$

where the parity transformation matrix P is orthogonal to H' and may be normalized:

$$p = \text{Pm} = \begin{bmatrix} \frac{-1}{\sqrt{1+\lambda^2}} & \frac{\lambda}{\sqrt{1+\lambda^2}} \end{bmatrix}\begin{bmatrix} \lambda m_1 \\ m_2 \end{bmatrix} = \frac{\lambda}{\sqrt{1+\lambda^2}}(m_2 - m_1) \quad [1]$$

With respect to random errors $\varepsilon_1$, $\varepsilon_2$ respectively associated with coasted and master coordinates $m_1$, $m_2$ (assumed Gaussian in nature) and in the absence of random faults:

$$p = \frac{\lambda}{\sqrt{1+\lambda^2}}(\varepsilon_2 - \varepsilon_1)$$

If, for example, $\varepsilon_1$ has sigma $\sigma_1$ and $\varepsilon_2$ has sigma $\sigma_2$, then $$\text{var}(p) = \frac{\lambda^2}{1+\lambda^2}\left(\sigma_1^2 + \sigma_1^2\right) = \frac{\lambda^2}{1+\lambda^2}\left(\lambda^2\sigma_1^2 + \sigma_1^2\right) = \frac{\lambda^2}{1+\lambda^2}\left(\lambda^2 + 1\right) = \sigma_2^2$$

and $$E(p) = \frac{\lambda}{\sqrt{1+\lambda^2}}[E((\varepsilon_2 - \varepsilon_1))] = 0$$

where p is Gaussian-distributed with a normalized sigma of 1 unit.

In embodiments, based on equation [1] above, when a fault (e.g., estimation error e, 204) occurs in the estimation of the master coordinate $m_2$, the parity element Pm 202 may grow accordingly such that Pm (e.g., Px, Py, Pz for their respective directions and coordinate pairs) may be used by integrity monitoring 114 as a test statistic against a test threshold 206 selected by integrity monitoring based on a desired false alarm rate. For example, based on a desired false-alarm rate of $10^{-5}$ (e.g., 1 in 100,000) a test threshold 206 of 4.417 may be selected. In some embodiments, e.g., when multiple coasting solutions (112*a*-112*n*, FIG. 1) are tested, the desired false-alarm rate, and thus the test threshold 206, may be evenly distributed among all tested coasting solutions. For example, if three coasting solutions 112*a*-112*n* are available for testing, each coasting solution may be associated with a false-alarm rate of 3.33 . . . $e^{-6}$ (e.g., $10^{-5}/3$) and a detection threshold of 4.4691.

In embodiments, for any direction x, y, or z in the local level frame the normalized test statistic Px, Py, or Pz (202) may be N (0,1). For example, depending on the direction of estimation error 204 (e.g., $e_x$, $e_y$, or $e_z$) induced by a spoofer fault, integrity monitoring 114 may test against all individual test statistics Px, Py, or Pz (202) in the local level frame and for each direction x, y, or z the test statistic p (202) may be computed per equation [1] above in terms of A, $m_1$, $m_2$ and compared with the selected test threshold 206. In embodiments, if any test statistic Px, Py, Pz (202) meets or exceeds the test threshold, a GNSS spoofer fault may be flagged and the associated master solution 110 replaced with the coasting solution 112 as the output solution 116. Further, the integrity bound 118 for the output solution 116 may be based on individual protection levels 208 associated with the cross comparison. For example, the cross comparisons of $x_1$, $x_2$ and $y_1$, $y_2$ in the x and y directions respectively may lead to individual x-direction and y-direction lateral protection levels 208 (LPL; also Horizontal Protection Level (HPL)) from which may be derived x-direction and y-direction integrity bounds, which in turn may be combined into a combined lateral integrity bound 118*a* (horizontal integrity bound). Similarly, the cross comparison of $z_1$, $z_2$ in the z direction may be associated with a z-direction vertical protection level 208 (VPL) from which may be determined a vertical integrity bound Level 118*b* (VPL).

In embodiments, integrity monitoring 114 may compute protection levels 208 for each direction x, y, z in the local level frame based on the corresponding test threshold 206 and missed-detection probability. Further, protection levels 208 may be computed for each tested coasting solution 112 (112*a*-112*n*, FIG. 1) and an optimal protection level selected as an integrity bound 118 for the output solution 116. For example, and as noted above, the general weighted least-squares solution $\hat{X}_{WLS}$ estimating the position state X based on the redundant measurements of coasted and master coordinates $m_1$, $m_2$ may be computed (e.g., in terms of primed parameters from equation [1] above):

$$\hat{X}_{WLS} = \left[(wH')^T wH'\right]^{-1}(wH')^T\left(w^T m'\right)$$

where weight matrix $$w = \begin{bmatrix} 1 & 0 \\ 0 & \alpha\lambda \end{bmatrix}.$$

Solving equation [1] with weight matrix w then gives:

$$\hat{X}_{WLS} = \frac{1}{1+\alpha^2} m_1 + \frac{\alpha^2}{1+\alpha^2} m_2$$

for master coordinate $m_2$ of the master solution 110 and coasted coordinate $m_1$ of the coasted solution 112.

In embodiments, the parameter a may be selected based on the desired output solution 116. For example, if the master solution 110 is the desired output solution 116, as a tends to infinity, $$\hat{X}_{WLS} = m_2$$

where $m_2$ is the master coordinate. Further, for GNSS fault $f_2$ associated with the master coordinate $m_2$, the position estimation error e (204) may be computed as:

$$e = \hat{X}_{WLS} - X = \left[(wH')^T wH'\right]^{-1}(wH')^T w\begin{bmatrix} 0 \\ f_2 \end{bmatrix}$$

and the parity element p (202) may be computed as:

$$p = P\begin{bmatrix} 0 \\ f_2 \end{bmatrix}.$$

In embodiments, the parity element p (202) and estimation error e (204) may be related such that as the GNSS fault $f_2$ varies in magnitude so do p and e also vary, which may determine the protection level 208 bounding the estimation error e as described in greater detail below. Further, integrity monitoring 114 may compute the protection level 208 bounding the estimation error e (204) prior to spoofer detection, as the computed protection level loses meaning upon detection of the spoofer.

Figure 3:
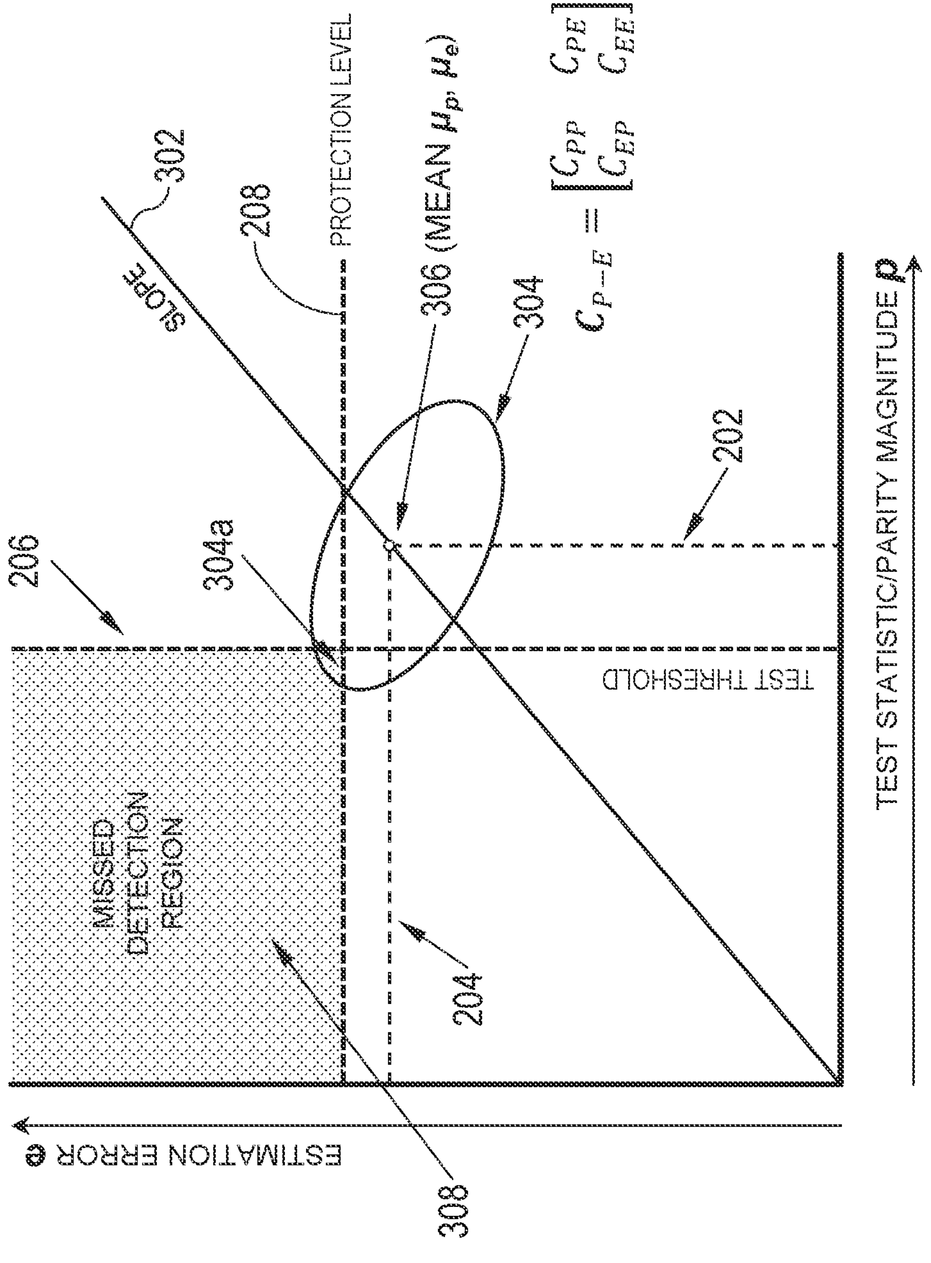
FIG. 3 is a graphical basis for determination of protection levels bounding the output solutions of the navigation system of FIG. 1 according to example embodiments of this disclosure.
Figure 3:

Referring also to FIG. 3, the graph 300 provides a basis for numerical computation of the protection level 208 bounding the estimation error e (204) for desired false-alarm and missed-detection probabilities.

In embodiments, the protection level 208 may have both a deterministic component and a statistical component. For example, the deterministic component of the protection level 208 may be defined by the slope 302 of the estimation error e (204) over the magnitude of the parity element p (202; e.g., test statistic Px, Py, Pz). Similarly, the statistical component may comprise a noisy scatter 304 (e.g., bivariate distribution) with a bivariate Gaussian density function between the test statistic p (202) and estimation error e (204). Further, the test statistic p (202) and estimation error e (204) may be Gaussian random variables whose means 306 ($\mu_p$, $\mu_e$) may be determined by the slope 302 and assumed bias in the measurement domain. For example, if the slope 302 can be expressed as:

$$\text{Slope}_2 = \frac{\alpha^2\sqrt{1+\lambda^2}}{\lambda(1+\alpha^2)}$$

then as parameter a tends toward infinity, $$\text{Slope}_2 = \frac{\sqrt{1+\lambda^2}}{\lambda}$$

Accordingly, if the GNSS fault f is assigned to the master coordinate $m_2$ of master solution 110 (thus f becomes $f_2$), then $$p_{mean} = \begin{bmatrix} \frac{-1}{\sqrt{1+\lambda^2}} & \frac{\lambda}{\sqrt{1+\lambda^2}} \end{bmatrix}\begin{bmatrix} 0 \\ f_2 \end{bmatrix} = \frac{\lambda f_2}{\sqrt{1+\lambda^2}}$$

and $$e_{mean} = \text{Slope}_2 \cdot p_{mean}$$

Further, for the bivariate distribution 304 (e.g., covariance CP-E) between the test statistic p (202) and estimation error e (204):

$$C_{P-E} = \begin{bmatrix} 1 & \frac{\alpha^2\lambda^2 - 1}{(1+\alpha^2)\lambda\sqrt{1+\alpha^2}} \\ \frac{\alpha^2\lambda^2 - 1}{(1+\alpha^2)\lambda\sqrt{1+\alpha^2}} & \frac{1+\alpha^4\lambda^2}{\lambda^2(1+\alpha^2)^2} \end{bmatrix} = \begin{bmatrix} C_{PP} & C_{PE} \\ C_{PE}^T & C_{EE} \end{bmatrix}$$

and, as $\alpha \to \infty$:

$$C_{PP} = 1$$

$$C_{PE} = \frac{\lambda}{\sqrt{1+\lambda^2}}$$

$$C_{EE} = 1$$

In embodiments, still referring to FIG. 3, when a GNSS fault $f_2$ appears and increases in size, the bivariate Gaussian scatter 304 may move upward along the slope 302. Further, when the GNSS fault $f_2$ reaches a specific size, an upper left-hand portion (304*a*) of the bivariate Gaussian scatter 304 may fall into a missed-detection region 308, indicating exactly the desired probability of missed detection driving determination of the protection level 208. For example, any cross comparison of coasted and master coordinates $m_1$, $m_2$ falling within the missed-detection region 308 would not have met or exceeded the test threshold 206 (e.g., with respect to the test statistic Pm, 202) but would have exceeded the protection level 208 (e.g., with respect to the estimation error e, 204). In embodiments, the desired (e.g., allowable) probability of missed detection (304*a*) may be determined by a level of integrity risk allocated to the navigation system output by the overall system safety assessment process for the aircraft or vehicle.

In embodiments, the determination of the protection level 208 as shown by FIG. 3 may be achieved via numerical methods of search and optimization. For example, as the test statistics 202 (Px, Py, Pz) are normalized with $\sigma_2$, the computation may yield a multiplier p which may then be multiplied by to obtain the desired protection level 208 ($\mu\sigma_2$).

Referring back to FIG. 2, and as noted above, if integrity monitoring 114 fails to detect a spoofer fault with respect to the master solution 110 in any direction, the master solution 110 may be used as the output solution 116. Further, in embodiments where multiple coasted solutions 112*a*-112*n* are available for testing, and (assuming no spoofer fault is detected with respect to any coasted solution) each test statistic 202 (Px, Py, Pz) is below the detection threshold, then the minimum protection level 208 may be selected from the three protection levels 208 determined for each solution component (for each direction, e.g., x, y, z, contributing to the master and coasted coordinates $m_1$, $m_2$). For example, for each solution component a minimum protection level 208 for a first coasted solution (112*a*, FIG. 1) may be lower than the protection levels determined for second and third coasted solutions (112*b*-112*n*, FIG. 1), but the minimum protection level may be sufficient to bound position error induced by measurement bias (which is consistent across test statistics 202 and across coasted solutions 112*a*-112*n*). Accordingly, when the output solution 116 is the master solution 110, the minimum of the set of protection levels (208, FIG. 2; e.g., PL(x), PL(y), PL(z)) may be provided as the integrity bound 118 (e.g., master integrity bound) for the output solution 116.

In embodiments, if a spoofer fault is detected with respect to the master solution 110 and a coasted solution 112*a*-112*n* is selected for substitution as the output solution 116, the protection level 208 associated with the selected coasted solution (e.g., with one or more system components thereof) may be provided as the integrity bound 118 for the output solution (e.g., a coasted integrity bound), and the selected coasted solution may continue to be propagated without any further updates from the master solution. For example, when updates to multiple coasted solutions 112*a*-112*n* are offset from each other as described above, the coasting solution least recently updated may be selected as the output solution 116, as the oldest coasting solution may be least likely to be tainted by GNSS spoofing.

Referring now to FIG. 4A, the method 400 may be implemented by the navigation system 100 and may include the following steps.

At a step 402, the integrity monitoring subsystem of the navigation system receives a master position solution, e.g., a position/navigation/time (PNT) solution of a vehicle position at least partially based on positioning signals received from a set of navigational satellites. The master position solution includes a set of master coordinates, e.g., one master coordinate for each direction or rotational axis (e.g., x/y/z, roll/pitch/yaw). In some embodiments, the master solution is a fully absolute position solution based on global navigation satellite system (GNSS) positioning signals and determined by a GNSS receiver. In some embodiments, the master solution is a blended solution based partially on an absolute position solution (e.g., a last known absolute position determined by the GNSS receiver) and partially on a relative position solution determined by an inertial reference system (IRS) of the navigation system, and the blended position solution updated with current absolute position data from the GNSS receiver as available.

At a step 404, the integrity monitoring subsystem receives one or more inertial coasted position solutions, wherein each coasted solution includes a set of coasted coordinates (similarly to the master coordinates, one for each direction or rotational axis). For example, each coasted solution may be based on a blended position solution but updated less frequently with absolute position data, i.e., each coasted solution "coasts" on its last updated absolute position data until the next scheduled solution update. In some embodiments, a group or set of coasted position solutions may have solution update periods offset from each other, e.g., updating according to the same solution update period but at different times relative to each other.

For each direction (e.g., for each of x, y, and z):

At a step 406, a parity space formulation is determined based on a master coordinate and a coasted coordinate for that direction, the parity space formulation including a parity element, e.g., test statistic, determining a consistency between the master and coasted coordinates as well as an estimation error (e.g., the extent to which the non-trusted master coordinate deviates from the trusted coasted coordinate).

At a step 408, a protection level is determined for that direction based on a desired missed-detection rate.

At a step 410, based on the determined protection levels, integrity bounds are calculated. For example, a coasted integrity bound may be based on protection levels associated with one or more solution components of a coasted position solution (e.g., the coasted position solution providing the current coasted coordinate). Similarly, a master integrity bound based on protection levels associated with the one or more solution components bounds the master position solution. In some embodiments, the master integrity bound may be based on the minimum protection level among all solution components of the master position solution. In some embodiments, the master or coasted integrity bound includes one or more of a vertical integrity bound based on a vertical (e.g., z-direction) protection level (VPL) and a combined lateral (horizontal) integrity bound based on x-direction and y-direction lateral integrity bounds, based in turn on x-direction and y-direction lateral protection levels (LPL; also horizontal protection levels (HPL)).

Figure 4B:
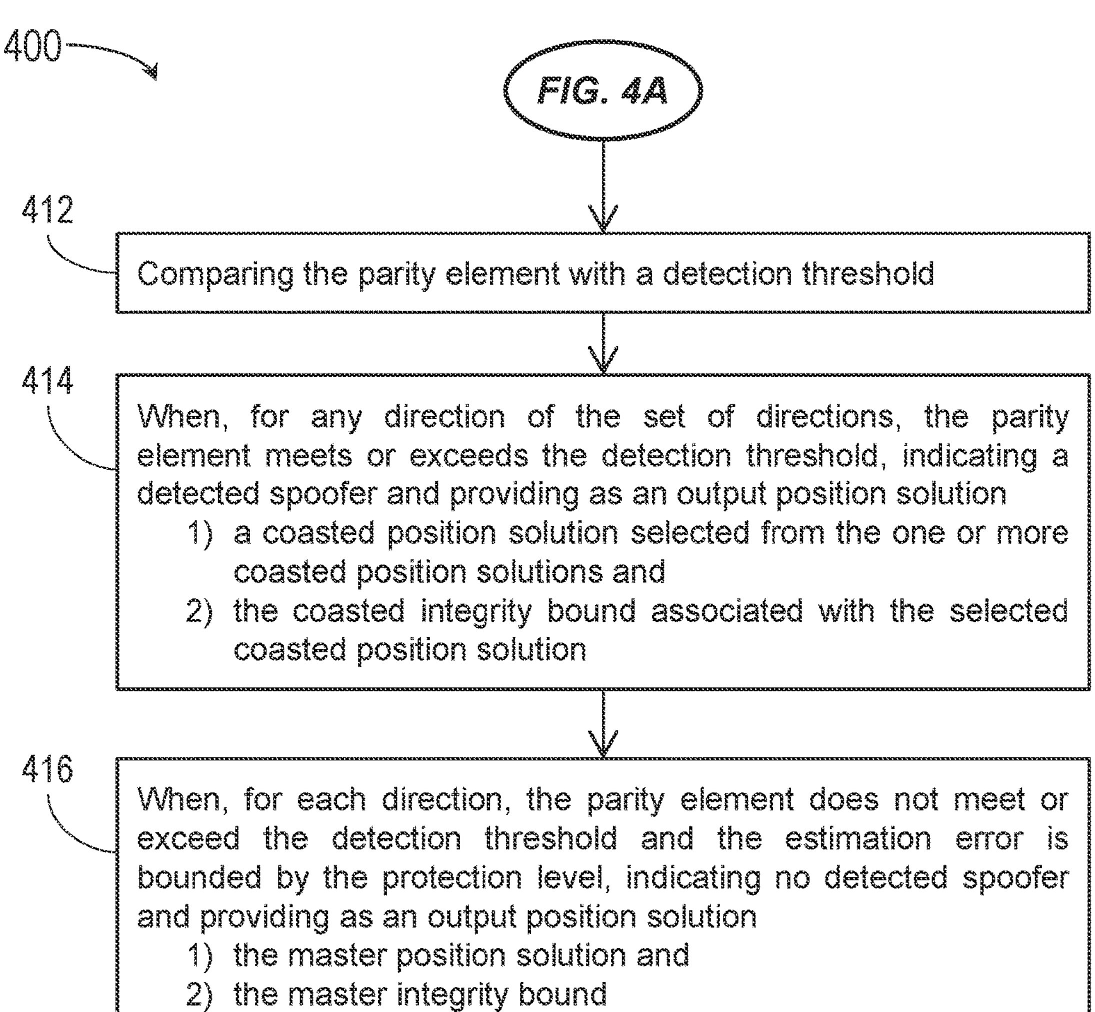

Referring also to FIG. 4B, at a step 412, the parity element is compared to a detection threshold (e.g., test threshold) to determine if a fault (e.g., divergence/deviation of the master coordinate from the corresponding coasted coordinate) sufficient to indicate potential GNSS spoofing is present.

At a step 414, when (for any direction) the test statistic meets or exceeds a test threshold (detection threshold), a detected GNSS spoofer is indicated. For example, when a spoofer fault is detected, a coasted position solution is selected as an output position solution for use by the navigation system and/or other applications (rather than the faulted master solution) and the corresponding coasted integrity bound for the selected coasted position solution is provided as an integrity bound on the output position solution. Further, the selected coasted solution will continue to be propagated without further updates from the master position solution. In some embodiments, if multiple offset coasted solutions are provided for integrity monitoring, the least recently updated coasted solution is selected as the output position solution (as this is the position solution least likely to be affected by the spoofer fault).

Figure 4C:
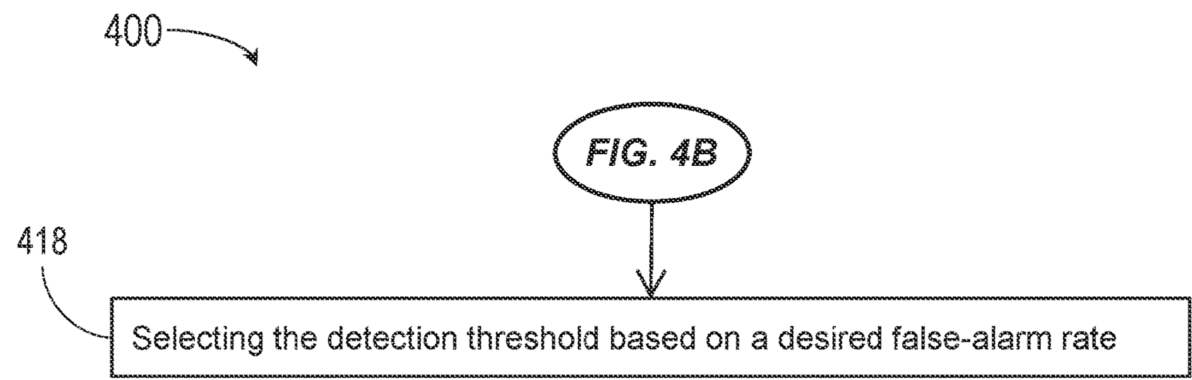

At a step 416, when for each direction the test statistic does not meet or exceed the test threshold, no GNSS spoofer fault is detected and the master position solution is maintained as the output position solution, with the master integrity bound provided as an integrity bound for the output position solution Referring also to FIG. 4C, the method 400 may include an additional step 418. At the step 418, the test threshold is selected based on a desired false-alarm rate. In some embodiments, if multiple coasting solutions are provided, the desired false-alarm rate may be distributed among the available coasting solutions.

CONCLUSION

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

We claim:

1. A vehicle-based navigational system comprising one or more processors configured to:

receive from at least one position receiver of the navigational system a master position solution at least partially derived by a satellite-based positioning receiver, the master position solution comprising a set of master coordinates corresponding to a set of directions and to a vehicle position;

receive from the at least one position receiver one or more coasted position solutions, each coasted position solution comprising a set of coasted coordinates corresponding to the set of directions and to the vehicle position;

for at least one first direction of the set of directions:

determine, based on a first master coordinate and a first coasted coordinate both corresponding to the at least one first direction, a parity space formulation comprising a parity element associated with a consistency between the first master coordinate and the first coasted coordinate;

determine, based on a desired missed-detection rate, a protection level corresponding to the first direction, wherein the at least one protection level includes both a deterministic component and a statistical component, wherein the deterministic component of the protection level is defined by a slope of an estimation error over a magnitude of the parity element, wherein the statistical components includes a noisy scatter;

determine, based on the at least one protection level, one or more of:

a coasted integrity bound associated with the coasted position solution providing the first coasted coordinate;

or a master integrity bound associated with the master position solution;

compare the parity element with a detection threshold; and when the parity element meets or exceeds the detection threshold:

indicate a detected spoofer;

and provide as an output position solution 1) a coasted position solution selected from the one or more coasted position solutions and 2) the coasted integrity bound associated with the selected coasted position solution;

and when, for each direction, the parity element does not meet or exceed the detection threshold:

indicate no detected spoofer;

and provide as the output position solution 1) the master position solution and 2) the master integrity bound.

2. The vehicle-based navigational system of claim 1, wherein:

the master position solution is an absolute position solution fully based on positioning signals transmitted by a plurality of navigational satellites and received by the satellite-based positioning receiver.

3. The vehicle-based navigational system of claim 2, wherein:

the plurality of navigational satellites includes at least one first navigational satellite associated with a first constellation and at least one second navigational satellite associated with a second constellation.

4. The vehicle-based navigational system of claim 1, wherein the at least one processor is configured to select the detection threshold based on a desired false-alarm rate.

5. The vehicle-based navigational system of claim 1, wherein:

each coasted position solution is based on:

a blended position solution derived partially by the satellite-based positioning receiver and partially by an inertial reference system (IRS);

and at least one solution update produced by the satellite-based positioning receiver;

and wherein each coasted position solution is based on at least one solution update offset relative to each other coasted position solution.

6. The vehicle-based navigational system of claim 5, wherein the master position solution is the blended position solution.

7. The vehicle-based navigational system of claim 5, wherein the at least one processor is configured to, when the detected spoofer is indicated, provide as the output position solution the least recently updated coasted position solution as the output position solution.

8. The vehicle-based navigational system of claim 1, wherein the at least one processor is configured to determine the master integrity bound by selecting a minimum protection level selected from the at least one protection level associated with the master position solution.

9. The vehicle-based navigational system of claim 1, wherein the at least one first direction is a first lateral direction and the protection level is a first protection level, further comprising:

determining a second protection level based on a second lateral direction of the set of directions;

determining a first lateral integrity bound based on the first protection level;

and determining a second lateral integrity bound based on the second protection level;

wherein the coasted integrity bound or the master integrity bound includes a combined lateral integrity bound based on the first and second lateral integrity bounds.

10. A method for detection of global navigation satellite system (GNSS) signal spoofing, the method comprising:

receiving, from at least one position receiver of a navigational system of a vehicle, a master position solution at least partially derived by a satellite-based positioning receiver, the master position solution comprising a set of master coordinates corresponding to a set of directions and to the vehicle position;

receiving, from the at least one position receiver, one or more coasted position solutions, each coasted position solution comprising a set of coasted coordinates corresponding to the set of directions and to the vehicle position;

for at least one first direction of the set of directions:

determining a parity space formulation based on the master coordinate and the coasted coordinate corresponding to the at least one first direction, the parity space formulation comprising a parity element associated with a consistency between the master coordinate and the coasted coordinate;

determining, based on a desired missed-detection rate, at least one protection level corresponding to the first direction, wherein the at least one protection level includes both a deterministic component and a statistical component, wherein the deterministic component of the protection level is defined by a slope of an estimation error over a magnitude of the parity element, wherein the statistical components includes a noisy scatter;

determining, based on the at least one protection level, one or more of:

a coasted integrity bound associated with the coasted position solution providing the coasted coordinate;

or a master integrity bound associated with the master position solution; and comparing the parity element with a detection threshold;

when, for any direction of the set of directions, the parity element meets or exceeds the detection threshold, indicating a detected spoofer and providing as an output position solution 1) a coasted position solution selected from the one or more coasted position solutions and 2) the coasted integrity bound associated with the selected coasted position solution;

and when, for each direction of the set of directions, the parity element does not meet the detection threshold, indicating no detected spoofer and providing as the output position solution 1) the master position solution and 2) the master integrity bound.

11. The method of claim 10, wherein receiving, from at least one position receiver of a navigational system of a vehicle, a master position solution at least partially derived by a satellite-based positioning receiver includes:

receiving an absolute position solution fully based on positioning signals received by the satellite-based positioning receiver and transmitted by a plurality of navigational satellites.

12. The method of claim 10, wherein receiving, from the at least one position receiver, one or more coasted position solutions includes:

receiving, from the at least one position receiver, one or more coasted position solutions, each coasted position solution based on 1) a blended position solution derived partially by the satellite-based positioning receiver and partially by an inertial reference system (IRS) and 2) at least one solution update produced by the satellite-based positioning receiver, wherein each coasted position solution is based on at least one solution update offset relative to each other coasted position solution.

13. The method of claim 12, wherein receiving, from at least one position receiver of a navigational system of a vehicle, a master position solution at least partially derived by a satellite-based positioning receiver includes:

receiving the blended position solution as the master solution.

14. The method of claim 10, further comprising:

selecting the detection threshold based on a desired false-alarm rate.

15. The method of claim 10, further comprising:

indicating a detected spoofer;

providing as an output position solution 1) a coasted position solution selected from the one or more coasted position solutions and 2) the coasted integrity bound for the selected coasted output position solution; and selecting the least recently updated coasted position solution as the output position solution.

16. The method of claim 10, wherein determining a master integrity bound associated with the master position solution includes:

selecting as the master integrity bound a minimum protection level selected from the at least one protection level.

17. The method of claim 10, wherein the at least one first direction is a first lateral direction and determining, based on the at least one protection level, one or more of a coasted integrity bound or a master integrity bound, includes:

determining a first lateral integrity bound based on a first protection level corresponding to the first lateral direction;

determining a second lateral integrity bound based on a second protection level corresponding to a second lateral direction of the set of directions;

and determining a combined lateral integrity bound based on the first and second lateral integrity bounds.

* * * * *